Aug. 21, 1928.
W. L. HOLT
1,681,539
MILK COOLER
Filed July 20, 1927
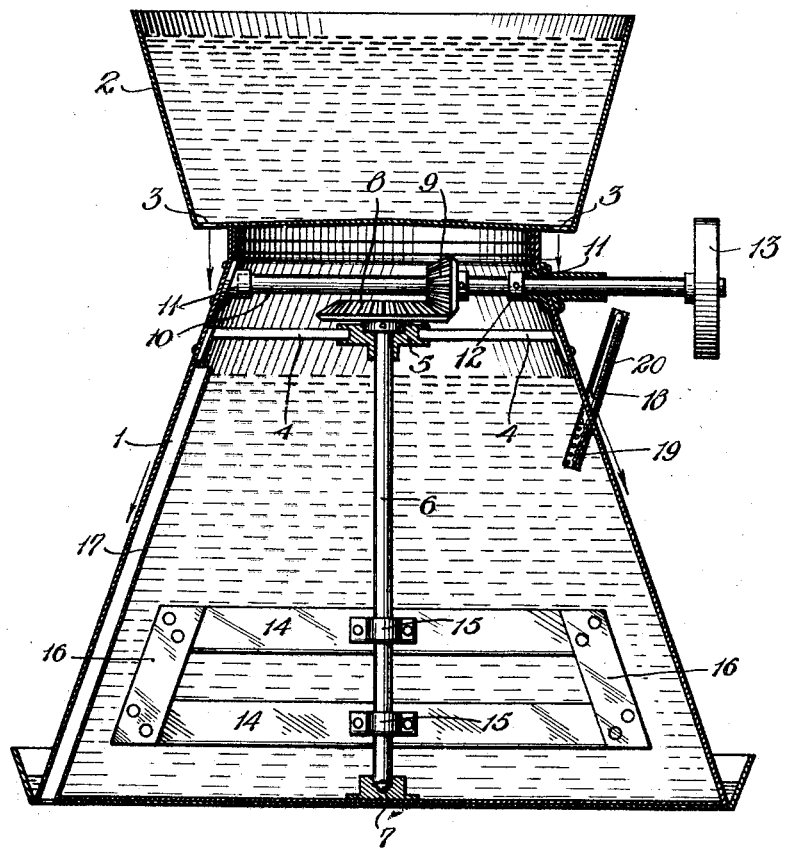
William L. Holt INVENTOR.
BY *[signature]*
ATTORNEY.

Patented Aug. 21, 1928.

1,681,539

UNITED STATES PATENT OFFICE.

WILLIAM LELAND HOLT, OF SCARBORO, MAINE.

MILK COOLER.

Application filed July 20, 1927. Serial No. 207,203.

Milk is graded nowadays more by the bacterial count per cubic centimeter than by the methods at the dairy, and the number of bacteria found by the laboratory man in a milk sample depends chiefly on how well the milk is cooled, stored and kept cold during delivery (excluding Pasteurization). Milk must have less than 50,000 bacteria per c. c. to get the "A" grade, and to produce such clean milk one must not only sterilize all pails, cans, bottles, etc., but also cool the milk promptly after milking to below 50° F., the nearer 40° F., the better. The great majority of small dairymen do not cool their milk below sixty because they cannot afford, or will not buy an efficient milk cooler, which prior to my invention cost at least a hundred dollars. They nearly all use the old-fashioned conical milk cooler, in which you put about fifty pounds of cracked ice with three to five pails of well water, the hot milk flows through many small holes in the edge of the upper chamber and flows in a thin film over the cold sloping surface. Now, the whole trouble with this old style cooler is that no means of keeping the ice-water well stirred is provided, only a long straight rod with a disc fastened to the end at right angles, which the dairyman is advised to stand and pull up and down all the time the milk is flowing over the cooler. Naturally, hardly any dairyman will give the time to pull this stirring rod back and forth for two or three minutes every time he pours the milk from each cow into his cooler. When he does keep it going and has plenty of ice, he cools his milk to an average of 50° to 55° F., but when he doesn't stir it, in 90% of the times, he cools it only to 68° to 70° F., or even worse, as I have repeatedly observed with a tested thermometer at dairies and at home.

The object of my invention is to perfect the simple, conical milk cooler now on the market, and a further object of my invention is to provide power operated agitators for milk coolers, whereby I am enabled to cool milk down to the ideal temperature of 42° F., to 45° F.; and with these and other objects in view, my invention consists of the parts and combination of parts as will be hereinafter more fully set out.

The figure of the drawing illustrated in my invention is a vertical sectional view through a milk cooler. The reference numeral 1 designates a truncated-cone shaped ice and water chamber upon which is mounted a milk receiving receptacle 2, said milk receiving receptacle having openings 3 through which the milk passes and flows on the outer face of the ice and water chamber 1 whereby it is cooled to the proper degree.

Suitable braces 4 are secured within the chamber 1, above the water line, and support at their center a bearing 5 in which the upper end of the shaft 6 is journalled, the lower end of the shaft being journalled in a suitable bearing 7 at the bottom of the chamber. This shaft 6 is provided with a bevel or other suitable gear wheel 8 which meshes with the bevel pinion 9, which, in turn, is keyed to the shaft 10, which shaft is mounted in suitable bearings 11, there being a stop 12 mounted on the shaft to limit its endwise movement. The shaft 10 is shown as being provided with a belt pulley 13, but, of course, it is understood that the shaft may, by suitable gear, be connected directly with a source of power.

On the shaft 6, and within the ice and water chamber 1 I secure agitator blades 14 by means of the blocks, or straps 15. The agitator blades 14 are spaced from each other and connected at their ends by braces 16 whereby the outer ends of the agitator blades are pressed and held in proper relation one with the other.

Within the chamber 1 I provide an overflow pipe 17, the top of which is slightly above the predetermined water line of the chamber, while the lower end of the pipe 17 extends to a point outside of the chamber. I also provide the water chamber with a metallic sleeve 18 secured in a suitable opening in the wall of the chamber, the lower end of which projects a predetermined distance within the ice and water chamber, and is perforated as at 19 to permit of the free flow of the water in the chamber through the lower end portion of the sleeve. Within this sleeve I secure a thermometer 20 which passes through a water-tight stopper in the sleeve 18, and can be read through the window formed in one face of the sleeve 18 whereby the dairyman can at a glance ascertain the temperature of the water in the chamber 1. This thermometer sleeve is so disposed within the chamber 1 that it does not interfere with the putting of ice in the chamber, and the sleeve protects the thermometer from being broken by coming in contact with the ice in the chamber 1. As will be seen from the drawing, the sleeve 18 is positioned at a steep angle relative to the vertical axis of the chamber 1, thereby still further eliminating liability of damage to the sleeve by the movement of ice in the chamber.

My improved ice cooler has, by actual experience, been found to be efficient, simple in operation, economical in operation, and will require little, or no attention from the operator except in the renewal of the ice.

The value of the agitator is that with the usual amount of ice and water I can cool milk down to a temperature of 42° F. to 45° F. without the use of brine or ammonia refrigeration, and to accomplish this the agitator need not turn faster than 40 R. P. M. and any suitable power may be used.

My invention enables the small dairyman to cool milk just as efficiently as is now done by the larger dairies with more expensive equipment.

I prefer to position the agitator blades near the bottom of the chamber 1, so that they will not come in contact with or be injured by the lumps of ice which float at the top of the water in the chamber.

I appreciate that changes may be made in the details of construction within the spirit of my invention, and without departing from the scope of the appended claim.

The reason why my revolving agitator improves the cooling about 25° F. is as follows: The hot milk rapidly heats a blanket or film of water next to the inner surface of the cooler, and unless stirred this warm water keeps the metal sides of cooler much warmer than the ice-water, which is thus rendered inefficient. The agitator blades, however, tear this warm layer of water away as fast as it is formed, by causing a circulation of all the water in the cooler, which also carries the ice lumps with it.

What I claim is:

In a milk cooler a truncated cone shaped ice and water chamber, a milk receiving receptacle mounted on said chamber and having milk exit ports in the bottom thereof to permit the milk to flow onto the exterior face of said chamber, a power operated agitator mounted within and near the bottom of said chamber, an overflow port at the predetermined water level discharging outside of the chamber, a thermometer casing extending into said chamber to a point below the predetermined water level and provided with a perforated end portion to permit entrance of the water in the chamber, the outer end of the casing extending above the water level of the chamber, and a thermometer secured in said casing.

In testimony whereof I affix my signature.

WILLIAM LELAND HOLT, M. D.